Dec. 15, 1925.  
E. H. VAN VALKENBERG  
1,565,690  
ENGINE MOUNTING  
Filed April 27, 1925
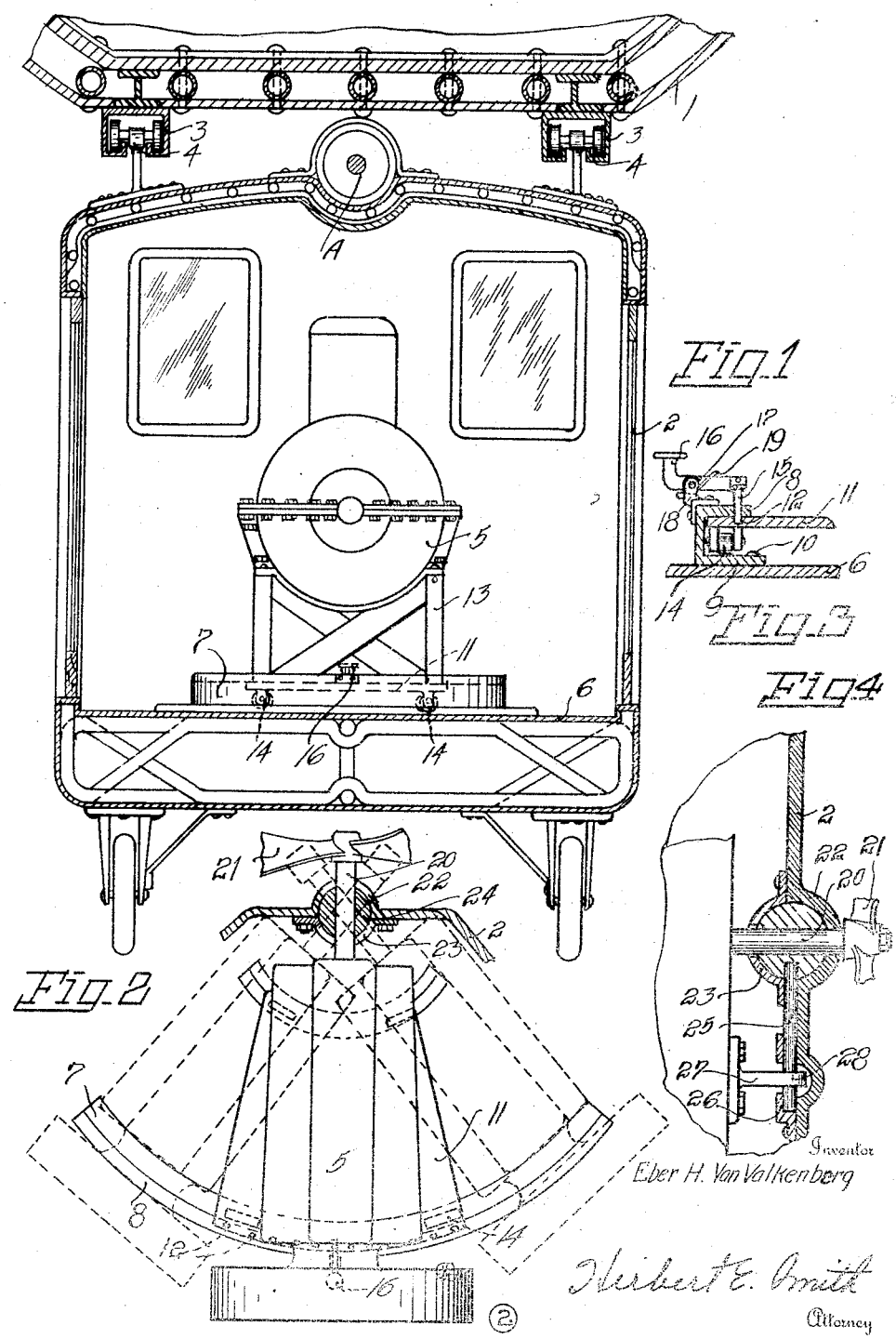

Patented Dec. 15, 1925.

1,565,690

UNITED STATES PATENT OFFICE.

EBER H. VAN VALKENBERG, OF MONROE, WASHINGTON, ASSIGNOR OF ONE-HALF TO OSCAR SILVERSTEIN, OF SPOKANE, WASHINGTON.

ENGINE MOUNTING.

Application filed April 27, 1925. Serial No. 26,079.

*To all whom it may concern:*

Be it known that I, EBER H. VAN VALKENBERG, a citizen of the United States, residing at Monroe, in Snohomish County, and State of Washington, have invented certain new and useful Improvements in Engine Mountings, of which the following is a specification.

My present invention relates to improvements in engine mountings especially adapted for use in dirigible airships or lighter-than-air craft. The primary object of the invention is the provision of means for mounting the fore and aft engines of the craft and its propellers in such manner that the propellers are capable of movement in azimuth or in a horizontal plane, and are thus available for use in maneuvering the ship.

In carrying out my invention means are provided whereby the engines or motors are retained in stable positions against vibrations or relative movement with respect to the frame of the gondola or car upon which they are mounted. The engines as thus mounted may be moved with facility by either manual power or mechanical power, and means are provided for retaining the engines or motors and their respective propellers in adjusted position.

The invention consists in certain novel combinations and arrangements of parts for carrying out my invention as will hereinafter be more fully set forth and specifically pointed out in the appended claims.

In the accompanying drawings I have illustrated one complete example of the physical embodiment of my invention wherein the parts are combined and arranged in accordance with one mode I have thus far devised for the practical application of the principles of my invention.

While I have illustrated one complete exemplification of the invention it will be understood that changes and alterations may be made therein, within the scope of my claims without departing from the principles of my invention.

While the engine mounting of my invention is readily adapted for use with various types of aircraft I have herein specifically illustrated it in connection with a dirigible balloon, and in the accompanying drawings:

Figure 1 is a vertical transverse sectional view through the keel portion of an aircraft of this type, showing also a gondola or car suspended therefrom in which the engine mountings of my invention are installed, one of the mountings being shown in rear elevation.

Figure 2 is a top plan view of one of the engine mountings, showing in section a portion of the bearing and frame construction of the gondola or car.

Figure 3 is a detail view of the means for locking the engine mounting in adjusted position.

Figure 4 is an enlarged vertical, detail sectional view, showing the vertical and ball and socket bearing for the propeller shaft of one of the mountings.

In Figure 1 I have shown the keel portion of the hull 1 of an aircraft and the gondola or car 2 suspended therefrom. The car is longitudinally movable with relation to the aircraft and the latter is provided with spaced longitudinally extending parallel tracks 3 located equidistant at the sides of the keel of the ship, in which tracks the two-wheel trucks 4 are suspended and adapted to travel. The trucks are arranged in two series and the car is suspended from the trucks in order that the relative positions of the craft and car may be varied, as by means of a motive fluid mechanism indicated at A in Figure 1.

The engine or motor as a whole is designated as 5 and it will be understood that the required number of motors or engines may be used, fore and aft of the car, or located at other advantageous points.

It will be understood that the engines or motors may be operated by suitable power and may be of any preferred type, preferably supported on the deck 6 of the car or upon suitable bases for the purpose. On the deck in proper position is located and fixed an arcuate track 7 with its axis along the keel line of the craft, and this track is fashioned with an upper flange as 8 and a lower flange 9, the track as a whole being bolted as at 10 through the lower flange to the deck or base of the mounting.

Beneath the engine is carried a base-plate 11 which has an arcuate rear edge located beneath the upper retaining flange 8 of the track, and near the edge is arranged a series of spaced bolt holes 12 in the plate. A frame 13 is used to rigidly connect the base plate with the engine and said frame is suitably braced to afford a stable supporting structure for the engine. The base plate and its connecting frame form a carriage for the engine, the whole being adapted to swing laterally with relation to the deck 6 and guided within the arcuate track 7.

For convenience in swinging the carriage and engine and guiding the movement of the whole structure, anti-friction rollers or wheels 14 are journaled beneath the base plate 11 and adapted to roll or run in the track 7.

For the purpose of locking the carriage in adjusted position a bolt 15 is employed in connection with the series of bolt holes 12 of the base plate. This bolt is carried or supported on the track 7 and passes through an opening in the upper flange 8, and a foot pedal 16, pivoted at 17 on bracket 18 of the track is employed to operate the bolt. A spring 19 is utilized to normally hold the bolt in locked position and to return the bolt to that position after pressure has been released from the pedal during the adjustment of the engine mounting.

The propeller or driving shaft of the engine is indicated by the numeral 20 said shaft extending longitudinally of the engine and projecting forwardly thereof through the gondola frame, with a suitable type of propeller 21 mounted on its exterior end.

In the frame of the gondola a bearing boss 22 of cup shape is attached in suitable manner at the exterior of the frame, and an interior complementary boss 23 is affixed to the frame to form a spherical housing in which is supported the spherical ball or bearing 24. The spherical housing is slotted to accommodate the shaft and the spherical bearing or ball is bored out to provide a journal bearing for the shaft which extends therethrough as indicated in Figure 4. It will be apparent that as the engine mounting is swung laterally with the journal bearing or ball 24 as a center, the shaft and propeller will swing with the ball in its housing, the slots of the housing permitting the required movement.

For stabilizing the movement of the mounting and insuring rigidity in its movement, a hinge bearing pin 25 is carried by the ball 24, which pin as seen in Figure 4 is centered on the vertical axis of the ball and projects downwardly therefrom and is supported in bearings 26. An eye-bolt or bracket 27 is rigidly affixed to the engine and connected at 28 to the pin in such manner as to brace the engine mounting and relieve the bearing of strains imposed thereon when the mounting is swung on its pivot.

From this description taken in connection with my drawings it will be apparent that the mounting may be swung in a horizontal plane, within the limits indicated by the dotted line positions in Figure 2 for adjusting the position of the propeller in maneuvering or steering the ship with efficiency and accuracy.

Having thus fully described my invention what I claim as new and desire to secure by Letters Patent is—

1. In an engine mounting the combination with a stationary arcuate track and an oscillatable bearing head and means for centering said head on its vertical axis, of an engine having a base plate supported in said track, a propeller shaft operated by the engine and journaled in said head, and a propeller on the shaft.

2. The combination with an arcuate track and oscillatable bearing head, of an engine having a plate guided in said track, a propeller shaft journaled in the head, a radial bolt centered in said head and a hinge coupling between said bolt and the engine.

3. The combination with an arcuate track having a base flange and a perforated top flange, of an engine mounting including a base plate having a series of bolt holes, a locking bolt therefor on the perforated flange, a shaft, an oscillatable bearing head in which said shaft is journaled, and a reinforcing connection between said mounting and bearing head.

4. The combination with an arcuate track having a base flange and an upper retaining flange and a locking device on the upper flange, of an engine having a perforated base plate for co-action with said locking device, anti-friction devices carried by said base plate for co-action with the track, an oscillatable head having a central radiating bolt and bearings therefor, means connecting said bolt to the engine, and a propeller shaft journaled in said head.

In testimony whereof I affix my signature.

EBER H. VAN VALKENBERG.